(12) United States Patent
Kozuka (10) Patent No.: US 12,394,207 B2
(45) Date of Patent: Aug. 19, 2025

(54) VEHICLE IMAGE PROCESSING DEVICE, VEHICLE, VEHICLE IMAGE PROCESSING METHOD, AND NON-TRANSITORY STORAGE MEDIUM STORING PROGRAM

(71) Applicant: TOYOTA JIDOSHA KABUSHIKI KAISHA, Toyota (JP)

(72) Inventor: Tomoyuki Kozuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 406 days.

(21) Appl. No.: 18/076,935

(22) Filed: Dec. 7, 2022

(65) Prior Publication Data

US 2023/0196785 A1    Jun. 22, 2023

(30) Foreign Application Priority Data

Dec. 22, 2021  (JP) ................. 2021-208692

(51) Int. Cl.
*G06V 20/59* (2022.01)
*G06V 20/56* (2022.01)

(52) U.S. Cl.
CPC .............. *G06V 20/56* (2022.01); *G06V 20/59* (2022.01)

(58) Field of Classification Search
CPC ............................... G06V 20/56; G06V 20/59
See application file for complete search history.

(56) References Cited

U.S. PATENT DOCUMENTS

2020/0074159 A1*  3/2020  Ohnishi ............. E05F 15/73

FOREIGN PATENT DOCUMENTS

| JP | 2014-044523 A | 3/2014 |
| JP | 6018840 B2 * | 11/2016 |
| JP | 2018-144544 A | 9/2018 |
| JP | 2018-156436 A | 10/2018 |
| JP | 2020-038608 A | 3/2020 |
| JP | 6724832 B2 * | 7/2020 |
| JP | 2020-186562 A | 11/2020 |
| JP | 2021-002272 A | 1/2021 |

* cited by examiner

*Primary Examiner* — Gregory A Morse
*Assistant Examiner* — Renae A Bitor
(74) *Attorney, Agent, or Firm* — Dinsmore & Shohl LLP (57) ABSTRACT

A vehicle image processing device includes: a processor configured to: acquire information comprising at least one of time information, position information, or vehicle information; estimate an operation scene of a vehicle based on the acquired information comprising at least one of time information, position information, or vehicle information; and perform image processing, in accordance with the estimated operation scene, on image information captured inside a vehicle cabin, or in surroundings, of the vehicle.

8 Claims, 6 Drawing Sheets

| OPERATION SCENE | PRIOR TO TRAVEL | DURING TRAVEL | BUS STOP: STATIONARY | DOOR OPENING/SLOPE DEPLOYMENT INITIATION | DOOR OPENING/SLOPE DEPLOYMENT COMPLETION |
|---|---|---|---|---|---|
| TIME INFORMATION | O | | | | |
| TRAVEL PLAN | O | | | | |
| POSITION INFORMATION | | O | O | O | O |
| VEHICLE INFORMATION | | O | O | O | O |
| DOOR OPENING/CLOSING INFORMATION | | | O | | O |
| DOOR OPENING/CLOSING IMAGE RECOGNITION PROCESSING | | | O | O | |
| WHEELCHAIR IMAGE RECOGNITION PROCESSING | | | | O | |
| DEPARTURE DETERMINATION IMAGE RECOGNITION PROCESSING | | | | | |
| FALLEN PERSON IMAGE RECOGNITION PROCESSING | | O | | | |

| OPERATION SCENE | DURING EMBARKING/DISEMBARKING | DOOR CLOSING/SLOPE STOWAGE INITIATION | DOOR CLOSING/SLOPE STOWAGE COMPLETION | DEPARTURE DETERMINATION | TRAVEL INITIATION |
|---|---|---|---|---|---|
| TIME INFORMATION | | | | | |
| TRAVEL PLAN | | | | | |
| POSITION INFORMATION | O | O | O | O | |
| VEHICLE INFORMATION | O | O | O | O | O |
| DOOR OPENING/CLOSING INFORMATION | | O | O | O | O |
| DOOR OPENING/CLOSING IMAGE RECOGNITION PROCESSING | | O | | | |
| WHEELCHAIR IMAGE RECOGNITION PROCESSING | | O | | | |
| DEPARTURE DETERMINATION IMAGE RECOGNITION PROCESSING | | | O | O | |
| FALLEN PERSON IMAGE RECOGNITION PROCESSING | O | | | | |

FIG.6

VEHICLE IMAGE PROCESSING DEVICE, VEHICLE, VEHICLE IMAGE PROCESSING METHOD, AND NON-TRANSITORY STORAGE MEDIUM STORING PROGRAM

CROSS-REFERENCE TO RELATED APPLICATION

This application is based on and claims priority under 35 USC 119 from Japanese Patent Application No. 2021-208692 filed on Dec. 22, 2021, the disclosure of which is incorporated by reference herein.

BACKGROUND

Technical Field

The present disclosure relates to a vehicle image processing device, a vehicle, a vehicle image processing method, and a non-transitory storage medium storing a program.

Related Art

Japanese Patent Application Laid-Open (JP-A) No. 2021-2272 discloses a vehicle control device used in an unmanned driving vehicle. The vehicle control device is configured such that a passenger information acquisition unit determines the situation of passengers, a vehicle information acquisition unit acquires vehicle information, and an execution unit performs vehicle control based on the passenger information and the vehicle information.

However, in the vehicle control device of JP-A No. 2021-2272, since image processing is always performed on images captured by monitoring cameras, an increased processing load may delay other processing such as that of a vehicle control device.

SUMMARY

The present disclosure provides a vehicle image processing device, a vehicle, a vehicle image processing method, and a program that can reduce the processing load.

A vehicle image processing device of a first aspect includes a processor, and the processor is configured to: acquire information including at least one of time information, position information, or vehicle information; estimate an operation scene of a vehicle based on the acquired information including at least one of time information, position information, or vehicle information; and perform image processing, in accordance with the estimated operation scene, on image information captured inside a vehicle cabin, or in surroundings, of the vehicle.

In the vehicle image processing device of the first aspect, the processor acquires at least one of time information, position information, or vehicle information. Further, the processor estimates an operation scene of the vehicle based on at least one of the acquired time information, position information, or vehicle information. Moreover, the processor performs image processing corresponding to the estimated operation scene on image information captured inside the vehicle cabin and in the vehicle surroundings. This enables only a minimum amount of image processing to be performed according to the respective operation scenes, which enables the processing load to be reduced.

A vehicle image processing device of a second aspect is the first aspect, in which the processor estimates that the operation scene is a door opening/closing scene, in which door opening/closing is performed, in a case in which the vehicle has stopped at a predetermined embarking/disembarking position, based on at least the position information and the vehicle information.

In the vehicle image processing device of the second aspect, in a case in which the vehicle has stopped at a predetermined embarking/disembarking position, the scene is estimated to be a door opening/closing scene in which the door is opened or closed. This enables the processing load to be reduced by performing only image processing corresponding to the door opening/closing scene.

A vehicle image processing device of a third aspect is the second aspect, in which the processor performs image processing on an image captured in a door periphery in a case in which the processor has estimated that the operation scene is the door opening/closing scene.

In the vehicle image processing device of the third aspect, by performing image processing on images of the door periphery in a door opening/closing scene, an occupant that might interfere with the door can be detected, enabling safety during opening and closing of the door to be ensured.

A vehicle image processing device of a fourth aspect is any one of the first aspect to the third aspect in which, in a case in which a time for vehicle departure has arrived in a state in which the vehicle is stationary at a predetermined embarking/disembarking position, the processor estimates that the operation scene is a vehicle departure scene, in which the vehicle departs from the embarking/disembarking position, based on at least the time information and the vehicle information.

In the vehicle image processing device of the fourth aspect, it is estimated that the operation scene is a vehicle departure scene in a case in which a departure time has arrived in a state in which the vehicle is stationary at a predetermined embarking/disembarking position. This enables the processing load to be reduced by performing only image processing corresponding to the vehicle departure scene.

A vehicle image processing device of a fifth aspect is the fourth aspect, in which the processor performs image processing configured to detect a standing passenger from an image captured inside the vehicle cabin in a case in which the processor has estimated that the operation scene is the vehicle departure scene.

In the vehicle image processing device of the fifth aspect, by detecting a standing occupant in a vehicle departure scene, attention can be drawn to the standing occupant at the time of departure.

A vehicle of a sixth aspect includes the vehicle image processing device of any one of the first aspect to the fifth aspect, and a vehicle control device configured to perform travel control and door opening/closing control of the vehicle, the travel control and the door opening/closing control being performed by the vehicle control device in accordance with image processing results.

In the vehicle of the sixth aspect, the travel control and the door opening/closing control are performed in accordance with image processing results, enabling safety to be ensured. Moreover, by only performing the image processing required according to the operation scene of the vehicle, the processing load can be reduced, enabling the occurrence of delays during travel control and door opening/closing control to be suppressed.

A vehicle image processing method of a seventh aspect includes: acquiring information including at least one of time information, position information, or vehicle information; estimating an operation scene of a vehicle based on the acquired information including at least one of time information, position information, or vehicle information; and performing image processing, in accordance with the estimated operation scene, on image information captured inside a vehicle cabin, or in surroundings, of the vehicle.

A non-transitory storage medium storing a program of an eighth aspect causes a computer to perform processing including: acquiring information including at least one of time information, position information, or vehicle information; estimating an operation scene of a vehicle based on the acquired information including at least one of time information, position information, or vehicle information; and performing image processing, in accordance with the estimated operation scene, on image information captured inside a vehicle cabin, or in surroundings, of the vehicle.

As described above, the vehicle image processing device, the vehicle, the vehicle image processing method, and the non-transitory storage medium storing a program according to the present disclosure enable the processing load to be reduced.

BRIEF DESCRIPTION OF THE DRAWINGS

Exemplary embodiments of the present disclosure will be described in detail based on the following figures, wherein.

DETAILED DESCRIPTION

Explanation follows regarding a vehicle V to which a vehicle image processing device 10 according to an exemplary embodiment has been applied, with reference to the drawings.

Figure 1:
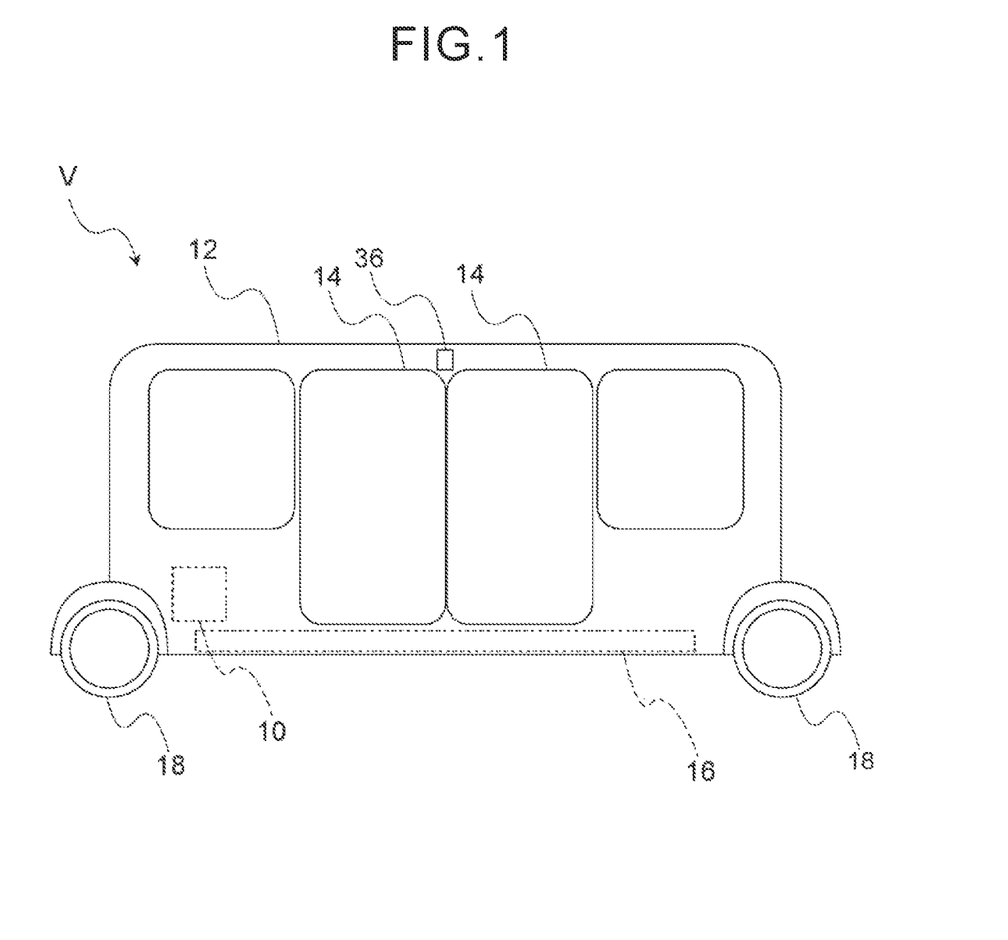
FIG. 1 is a schematic side view of a vehicle according to an exemplary embodiment, illustrating a state in which a door is closed.

As illustrated in FIG. 1, the vehicle V of the present exemplary embodiment is provided with a vehicle body 12 that is substantially rectangular in side view, and two doors 14 are provided at a left side surface of the vehicle main body 12 relative to a direction of travel.

The two doors 14 are arranged side by side in the front-rear direction, and cover an entrance 15 (see FIG. 2) formed at a left side surface of the vehicle body 12, so as to be openable and closable. The two doors 14 are respectively opened and closed at a predetermined timing by a door opening/closing device 44 (see FIG. 3).

Figure 2:
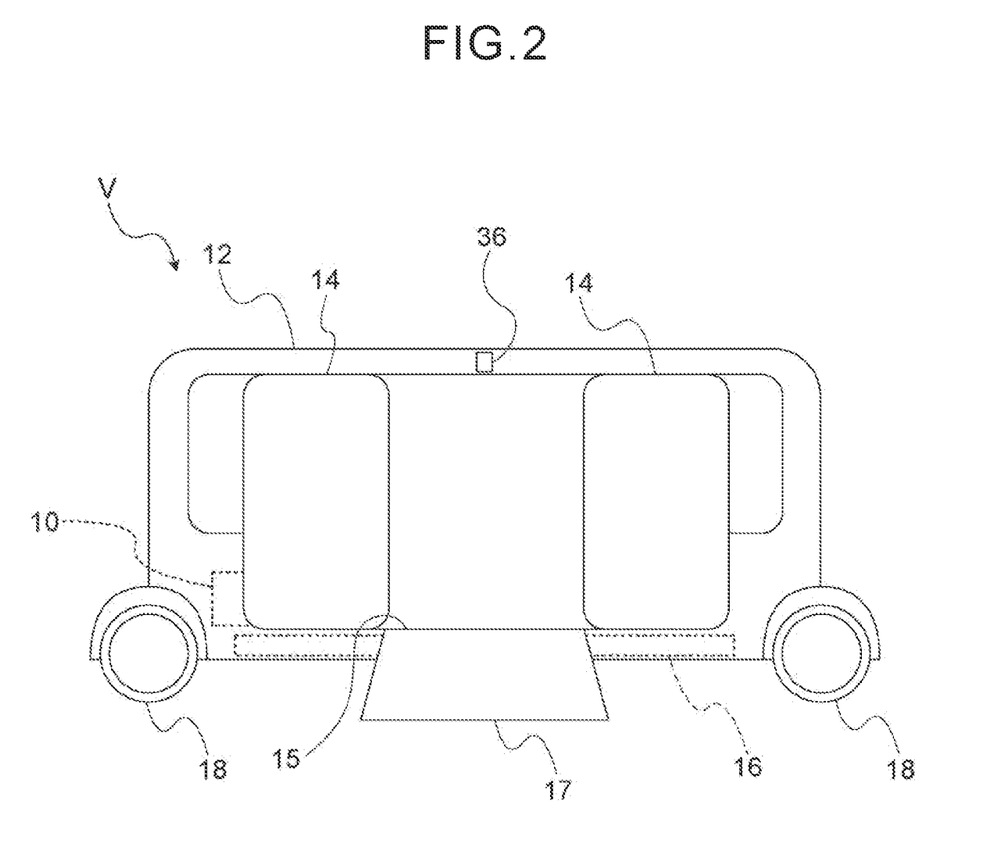
FIG. 2 is a schematic side view of a vehicle according to an exemplary embodiment, illustrating a state in which a door is open.

As illustrated in FIG. 2, in a state in which the door 14 has been opened, the entrance 15 is open and an occupant (passenger) is able to get in and out of the vehicle V. Moreover, the vehicle V of the present exemplary embodiment is configured so as to deploy a slope 17 after the door 14 has been opened. The slope 17 extends from a bottom edge of the entrance 15 away from the vehicle V, and is deployed so as to eliminate a step between the entrance 15 and the entrance position so as to enable a wheelchair user or the like to board the vehicle. Accordingly, before the departure of the vehicle V, the door 14 is closed after the slope 17 has been stowed away. In this way, the vehicle V of the present exemplary embodiment is, for example, a vehicle for passenger transportation, and plural seats, hanging straps and handrails that can be gripped by a passenger in a standing state, and the like (not illustrated) are provided inside the vehicle cabin of the vehicle V.

A battery 16 is installed at a lower portion of the vehicle body 12, and front and rear wheels 18 are driven by power supplied from the battery 16 to a motor (not illustrated). Namely, an example of the vehicle V of the present exemplary embodiment is a battery electric vehicle (BEV) using a motor as a drive source.

Moreover, as an example, the vehicle V of the present exemplary embodiment is configured so as to be capable of autonomous driving, and travels along a predetermined travel route. Moreover, the vehicle V stops at a predetermined embarking/disembarking position established on the travel route, opens the door 14, and enables passengers to board at, and alight from, the entrance 15.

Here, the vehicle image processing device 10 is provided in the vehicle V, and the vehicle image processing device 10 is configured to perform image processing corresponding to respective operation scenes of the vehicle V.

Hardware Configuration of the Vehicle Image Processing Device 10

Figure 3:
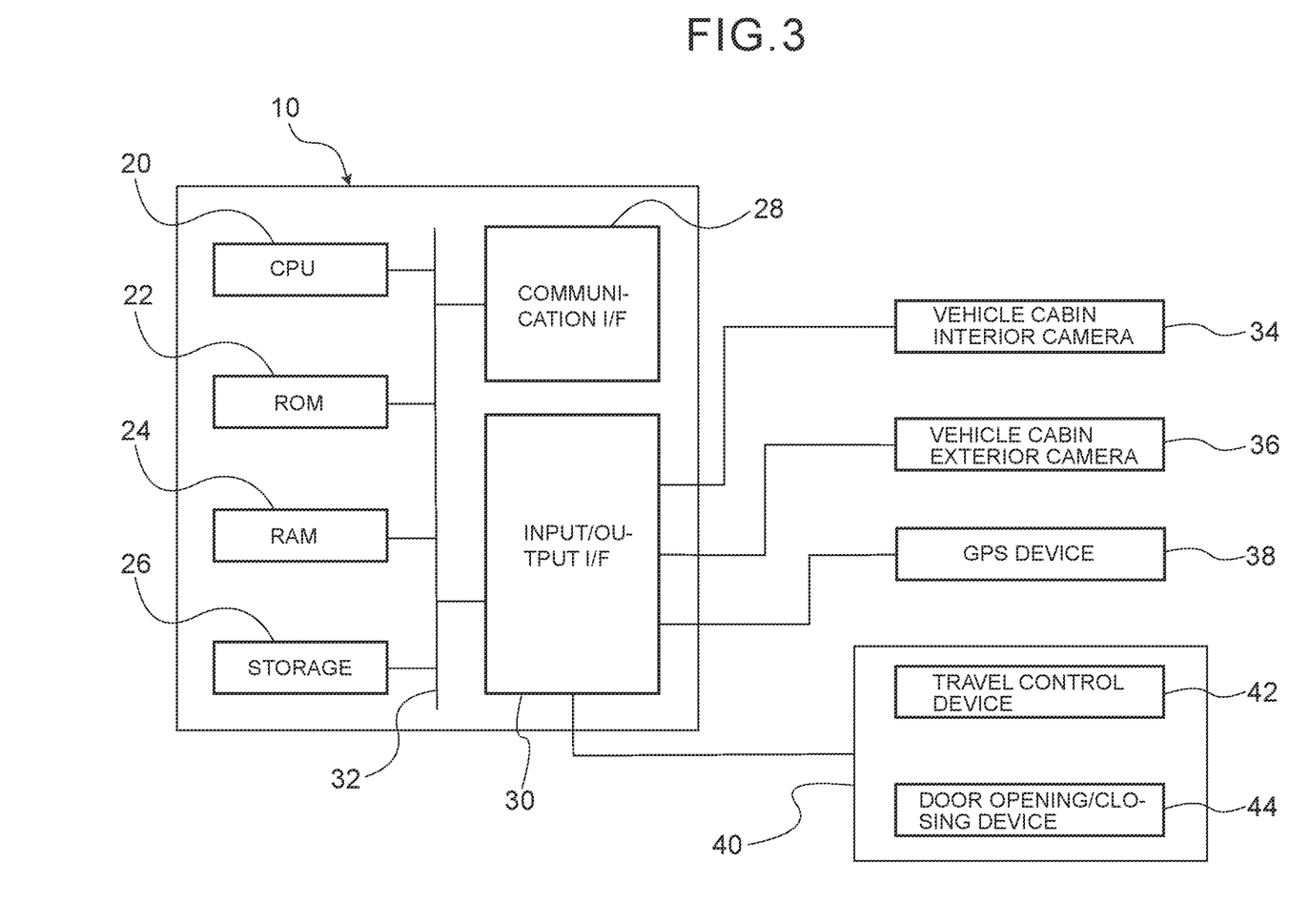
FIG. 3 is a block diagram illustrating a hardware configuration of a vehicle image processing device according to an exemplary embodiment.

FIG. 3 is a block diagram illustrating a hardware configuration of the vehicle image processing device 10. As illustrated in FIG. 3, the vehicle image processing device 10 includes a central processing unit (CPU: processor) 20, read only memory (ROM) 22, random access memory (RAM) 24, a storage 26, a communication interface (I/F) 28, and an input/output interface (I/F) 30. These respective configurations are connected via a bus 32 so as to be capable of communicating with each other.

The CPU 20 is a central processing unit that executes various programs and controls various units. Namely, the CPU 20 reads a program from the ROM 22 or the storage 26, and executes the program using the RAM 24 as a workspace. The CPU 20 controls the respective configurations described above in accordance with a program recorded in the ROM 22 or the storage 26, and performs various computation processing.

The ROM 22 stores various programs and various data. The RAM 24 serves as a workspace to temporarily store programs and data. The storage 26 is configured by a hard disk drive (HDD) or a solid state drive (SSD), and stores various programs including an operating system, as well as various data. In the present exemplary embodiment, programs, various data, and the like for performing image processing are stored in the ROM 22 or the storage 26.

The communication I/F 28 is an interface used by the vehicle image processing device 10 to communicate with external servers and other devices and, for example, protocols such as the Controller Area Network (CAN), Ethernet (registered trademark), Long Term Evolution (LTE), Fiber Distributed Data Interface (FDDI), Wi-Fi (registered trademark) are used.

The input/output I/F 30 is electrically connected to a vehicle cabin interior camera 34, a vehicle cabin exterior camera 36, a global positioning system (GPS) device 38, and a vehicle control device 40. The vehicle cabin interior camera 34 is provided singly or plurally inside the vehicle cabin of the vehicle V, and images the interior of the vehicle cabin. For example, plural vehicle cabin interior cameras 34 are provided at a ceiling part and at side faces inside the vehicle cabin.

The vehicle cabin exterior camera 36 is provided singly or plurally inside or outside the vehicle cabin of the vehicle V, and images the vehicle periphery. As illustrated in FIG. 1 and FIG. 2, the vehicle cabin exterior camera 36 is provided at an upper edge of the entrance 15, and images the surroundings of the entrance 15. The vehicle cabin exterior camera 36 may include a forward camera provided at a front portion of the vehicle V and imaging ahead of the vehicle, and a rearward camera provided at a rear portion of the vehicle V and imaging behind the vehicle.

The GPS device 38 is a device that receives GPS signals from plural GPS satellites to establish the position of the vehicle V.

The vehicle control device 40 includes a travel control device 42 and a door opening/closing device 44. The travel control device 42 is a device that performs travel control of the vehicle V, and includes an acceleration/deceleration actuator that adjusts acceleration/deceleration of the vehicle V, a steering actuator that drives a steering device of the vehicle V, and the like. The travel control device 42 performs autonomous driving of the vehicle V by controlling the acceleration/deceleration actuator and the steering actuator in accordance with the peripheral situation of the vehicle detected by sensors (not illustrated) that scan the vehicle periphery.

Moreover, a storage unit of the vehicle control device 40 stores a planned travel path that represents a path along which it has been planned that the vehicle V will travel, and also stores a travel plan for the vehicle V. The travel control device 42 causes the vehicle V to travel based on the planned travel path and the travel plan stored in the storage unit. As an example, the vehicle V of the present exemplary embodiment drives the vehicle V based on information including time information acquired from an external server or the like, position information acquired from the GPS device 38, and a stored travel plan.

The door opening/closing device 44 is a device that opens and closes the two doors 14 at a predetermined timing. For example, the two doors 14 are respectively configured to be slidable along rails in a state supported on the rails, which extend in the front-rear direction of the vehicle. The door opening/closing device 44 includes a motor (not illustrated), and this motor is connected to the door 14. The configuration is such that by actuating the motor, the door 14 can be slid along the rail, whereby opening and closing of the door 14 is performed.

The door opening/closing device 44 includes a slope moving mechanism that deploys and stows the slope 17. Accordingly, after opening the door 14, the door opening/closing device 44 uses the slope moving mechanism to move the slope 17 from the stowed position to the deployed position. Further, the door opening/closing device 44 closes the door 14 after moving the slope 17 from the deployed position to the stowed position.

Functional Configuration of the Vehicle Image Processing Device 10

The vehicle image processing device 10 implements various functions using the hardware resources described above. Explanation follows regarding the functional configuration implemented by the vehicle image processing device 10, with reference to FIG. 4.

Figure 4:
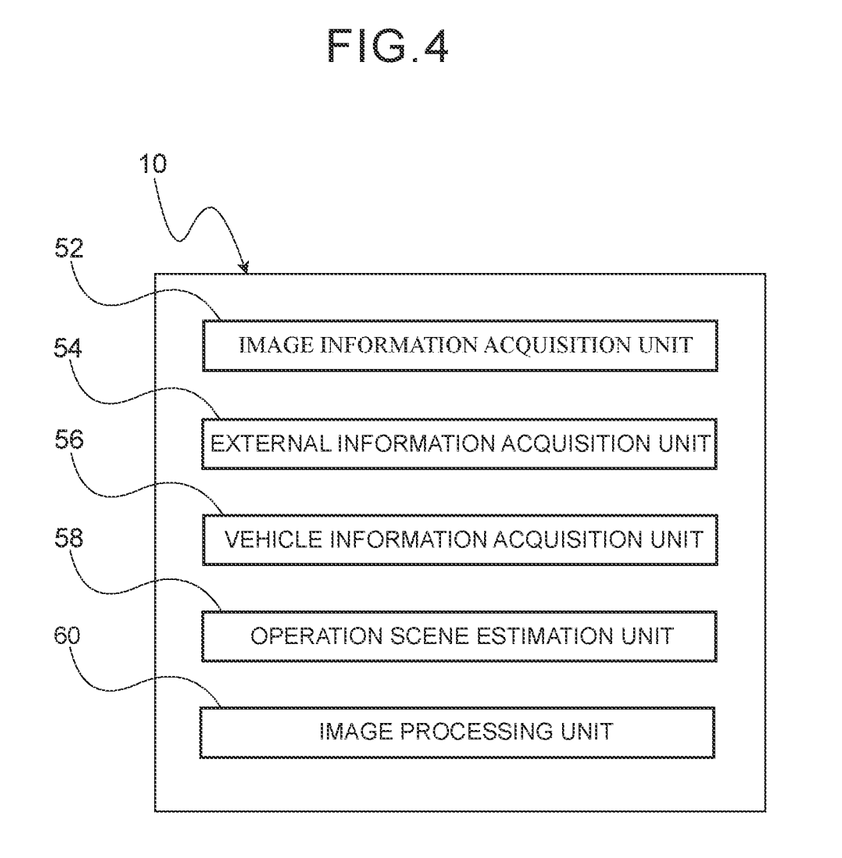
FIG. 4 is a block diagram illustrating a functional configuration of a vehicle image processing device according to an exemplary embodiment.

As illustrated in FIG. 4, the vehicle image processing device 10 includes, as functional configurations, an image information acquisition unit 52, an external information acquisition unit 54, a vehicle information acquisition unit 56, an operation scene estimation unit 58, and an image processing unit 60. The respective functional configurations are implemented by the CPU 20 reading and executing a program stored in the ROM 22 or the storage 26.

The image information acquisition unit 52 acquires image information captured inside the vehicle cabin and in the vehicle surroundings. More specifically, the image information acquisition unit 52 acquires image information captured by the vehicle cabin interior camera 34 and the vehicle cabin exterior camera 36.

The external information acquisition unit 54 acquires information such as time information and position information. Specifically, the external information acquisition unit 54 acquires the current time from an external server (not illustrated). Further, the external information acquisition unit 54 acquires current position information for the vehicle V from the GPS device 38. Moreover, the external information acquisition unit 54 may acquire various kinds of information other than image information and vehicle information, and may acquire information regarding a travel plan of the vehicle V, for example.

The vehicle information acquisition unit 56 acquires information such as information regarding the behavior of the vehicle V. Specifically, based on a signal from the vehicle control device 40, the vehicle information acquisition unit 56 acquires information such as the vehicle speed of the vehicle V, shift lever information, the situation of the door 14, and the situation of the slope 17.

The operation scene estimation unit 58 estimates the operation scene of the vehicle V based on at least one of the time information, the position information, the travel plan, and the vehicle information acquired by the external information acquisition unit 54 and the vehicle information acquisition unit 56. Explanation follows regarding an example of an operation scene of the vehicle V estimated by the operation scene estimation unit 58 of the present exemplary embodiment, with reference to FIG. 5.

Figure 5:
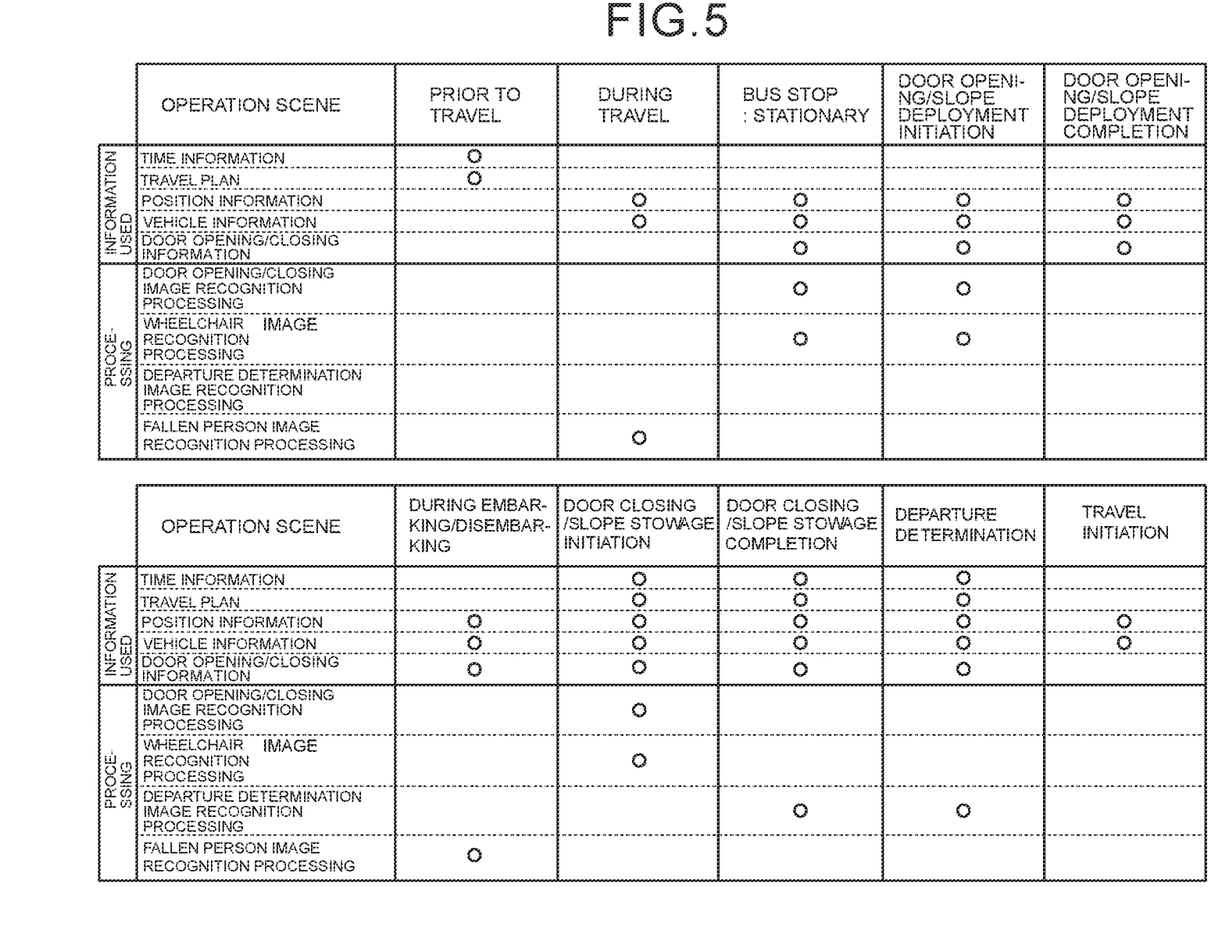
FIG. 5 is a table illustrating examples of image processing performed for respective operation scenes.

As illustrated in FIG. 5, the operation scene estimation unit 58, based on the time information and the travel plan information, in a case in which the current time is earlier than the driving start time, estimates the scene to be a scene prior to travel.

Moreover, the operation scene estimation unit 58, based on the position information and the vehicle information, in a case in which the shift lever is in the drive range and the position of the vehicle V is moving, estimates the scene to be a scene during travel.

Based on the position information, the vehicle information, and the door opening/closing information, in a case in which the shift lever is switched to the parking range in a state in which the vehicle V is positioned at a bus stop that is an embarking/disembarking position, the operation scene estimation unit 58 estimates the scene to be a scene of having stopped at the bus stop (a stationary scene).

The operation scene estimation unit 58, based on the position information, the vehicle information, and the door opening/closing information, in a case in which the door 14 is moving from a closed state to an open state in a state in which the vehicle V is stationary at a bus stop and the shift lever is in the parking range, or in a case in which the slope 17 has moved from the stowed position to the deployed position, estimates the scene to be a scene during door opening.

The operation scene estimation unit 58, based on the position information, the vehicle information, and the door opening/closing information, in a case in which the slope 17 has moved to the deployed position in a state in which the vehicle V is stationary at the bus stop and the shift lever is in the parking range, estimates the scene to be a scene of door opening completion.

The operation scene estimation unit 58, based on the position information, the vehicle information, and the door opening/closing information, during a period from completion of deployment of the slope 17 until a predetermined time has elapsed, estimates the scene to be a scene during embarking and disembarking.

The operation scene estimation unit 58, based on the time information, the travel plan, the position information, the vehicle information, and the door opening/closing information, in a case in which the current time has reached the departure time or a predetermined time prior to the departure time, and in a case in which the door 14 is moving from the open state to the closed state in a state in which the vehicle V is stationary at the bus stop and the shift lever is in the parking range, or in a case in which the slope 17 has moved from the deployed position to the stowed position, estimates the scene to be a scene during door closure. Here, a scene during door opening and a scene during door closure are sometimes referred to together as a door opening/closing scenes.

The operation scene estimation unit 58, based on the time information, the travel plan, the position information, the vehicle information, and the door opening/closing information, in a case in which the current time has reached the departure time or a predetermined time prior to the departure time, and in a case in which the door 14 has moved to the closed position in a state in which the vehicle V is stationary at the bus stop and the shift lever is in the parking range, estimates the scene to be a scene of door closure completion.

The operation scene estimation unit 58, based on the time information, the travel plan, the position information, the vehicle information, and the door opening/closing information, until a predetermined period of time has elapsed since the scene of door closure completion, estimates the scene to be a scene of departure determination.

The operation scene estimation unit 58, based on the position information and the vehicle information, in a case in which the vehicle speed has increased from 0 in a state in which the vehicle V is at the bus stop, estimates the scene to be a scene of travel initiation.

The image processing unit 60 illustrated in FIG. 4 performs image processing corresponding to the estimated operation scene with respect to the image information acquired by the image information acquisition unit 52. Explanation follows regarding an example of image processing performed by the image processing unit 60 of the present exemplary embodiment, with reference to FIG. 5.

As illustrated in FIG. 5, in the present exemplary embodiment, the image processing unit 60 executes four items of image processing: door opening/closing image recognition processing, wheelchair image recognition processing, departure determination image recognition processing, and critical-state patient image recognition processing.

In a scene during travel and a scene during embarking/disembarking, the image processing unit 60 performs fallen person image recognition processing. In this fallen person image recognition processing, a passenger who has fallen inside the vehicle cabin is detected based on image information captured by the vehicle cabin interior camera 34. Moreover, in the fallen person image recognition processing, a critical-state passenger such as a passenger who is unable to move on the floor inside the vehicle cabin is detected.

In a scene of having stopped at the bus stop and in door opening/closing scenes, the image processing unit 60 executes door opening/closing image recognition processing and wheelchair image recognition processing. The door opening/closing image recognition processing detects the behavior of a passenger standing in the vicinity of the door 14 based on image information captured by the vehicle cabin interior camera 34 and the vehicle cabin exterior camera 36. Moreover, the wheelchair image recognition processing detects the behavior of a passenger using a wheelchair based on image information captured by the vehicle cabin interior camera 34 and the vehicle cabin exterior camera 36.

In a scene of door closure completion or a scene of departure determination, the image processing unit 60 performs departure determination image recognition processing. The departure determination image recognition processing detects that a passenger onboard the vehicle V has been seated in a seat based on image information captured by the vehicle cabin interior camera 34. Moreover, the departure determination image recognition processing detects that a passenger standing inside the vehicle cabin is holding a hanging strap or a handrail. Moreover, the departure determination image recognition processing detects a person who has approached a region surrounding the door 14 outside the vehicle V, based on image information captured by the vehicle cabin exterior camera 36.

Here, the image processing unit 60 is configured to not perform any image processing for a scene prior to travel, a scene of door opening completion, or a scene of travel initiation.

The travel control device 42 and the door opening/closing device 44 are controlled by the vehicle control device 40 in accordance with the results of the image processing executed by the image processing unit 60. For example, in a scene of having stopped at a bus stop or scenes of door opening/closing, in a case in which a passenger standing in the vicinity of the door 14 has been detected based on the image processing results of the door opening/closing image recognition processing, the movement of the door 14 is paused and the passenger is notified in a predetermined manner.

Moreover, in a departure determination scene, based on an image processing result of the departure determination image recognition processing, an occupant who is standing is requested to be seated. Moreover, an occupant who is not holding a hanging strap or a handrail in a standing state is requested to hold a hanging strap or a handrail.

Operation

Next, explanation follows regarding the operation of the present exemplary embodiment.

Example of Image Processing

Figure 6:
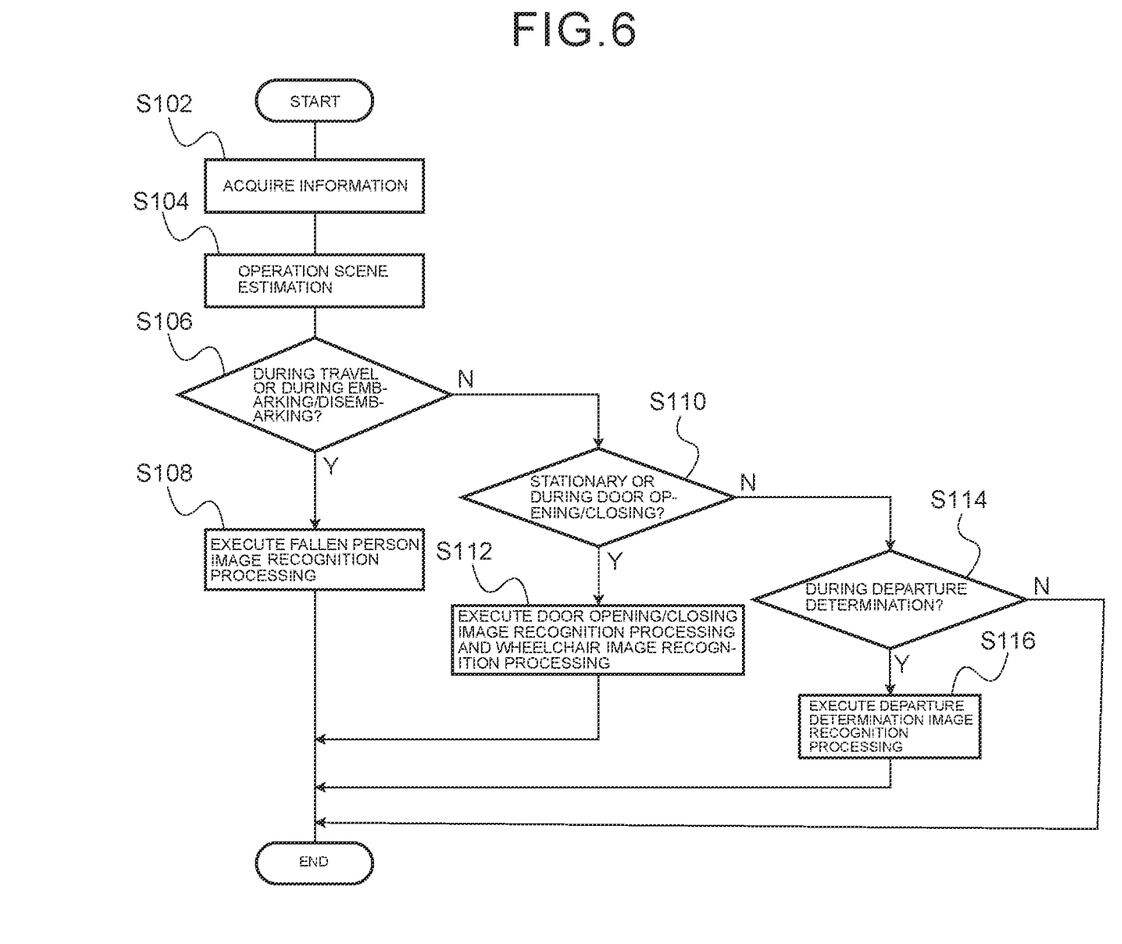
FIG. 6 is a flowchart illustrating an example of a flow of image processing according to an exemplary embodiment.

Explanation follows regarding an example of image processing performed by the vehicle image processing device 10 according to the present exemplary embodiment, with reference to the flowchart illustrated in FIG. 6. This image processing is executed by the CPU 20 reading a program from the ROM 22 or the storage 26 and opening this program in the RAM 24.

The CPU 20 acquires information at step S102. Specifically, the CPU 20 acquires image information by utilizing the function of the image information acquisition unit 52, and acquires vehicle information by utilizing the function of the vehicle information acquisition unit 56. Moreover, the CPU 20 acquires predetermined information other than image information and vehicle information, by utilizing the function of the external information acquisition unit 54.

At step S104, the CPU 20 estimates an operation scene. Specifically, the CPU 20, utilizing the function of the operation scene estimation unit 58, based on at least one of time information, position information, a travel plan, and vehicle information acquired by the external information acquisition unit 54 and the vehicle information acquisition unit 56, estimates an operation scene of the vehicle V. Here, it is estimated which operation scene from among prior to travel, during travel, stopped at a bus stop, during opening/closing of a door, during embarking/disembarking, or during departure determination the operation scene of the vehicle V corresponds to.

At step S106, the CPU 20 determines whether or not the estimated operation scene is during travel or during embarking/disembarking. Then, in a case in which the CPU 20 has determined that the operation scene is during travel or during embarking/disembarking, an affirmative determination is made at step 5106, and processing transitions to step 5108. Further, in a case in which the CPU 20 has determined that the operation scene is not during travel or during embarking/disembarking, the determination at step S106 is negative, and the processing transitions to step S110.

The CPU 20 executes the fallen person image recognition processing at step S108, after which the present processing is ended.

In a case in which the determination at step S106 is negative, the CPU 20 transitions to step S110, and determines whether or not the estimated operation scene is stationary or during door opening/closing. In a case in which the CPU 20 has determined that the operation scene is stationary or during door opening/closing, an affirmative determination is made at step S110, and processing transitions to step S112. Further, in a case in which the CPU 20 has determined that the operation scene is not stationary or during door opening/closing, a negative determination is made at step S110, and processing transitions to step S114.

The CPU 20 executes the door opening/closing image recognition processing and the wheelchair image recognition processing at step S112, after which the present processing is ended.

In a case in which the determination at step S110 is negative, the CPU 20 transitions to step S114, and determines whether or not the estimated operation scene is during departure determination. Then, in a case in which the CPU 20 has determined that the operation scene is during departure determination, the determination at step S114 is affirmative, and the processing transitions to step S116. Further, in a case in which the CPU 20 has determined that the operation scene is not during departure determination, a negative determination is made at step S114, and the present processing is ended. Namely, in a case in which the CPU 20 has determined that the estimated operation scene is none of prior to travel, during travel, stationary at a bus stop, during door opening/closing, during embarking/disembarking, or during departure determination, since the operation scene is one, such as prior to travel, that does not require image processing, the present processing is ended without performing image processing.

The CPU 20 executes the departure determination image recognition processing at step S116, after which the present processing is ended.

As described above, in the vehicle image processing device 10 according to the present exemplary embodiment, in order to perform image processing corresponding to an estimated operation scene on image information captured inside the vehicle cabin and in the vehicle surroundings, the minimum required image processing corresponding to the respective operation scenes can be performed, enabling the processing load to be reduced.

In particular, in a vehicle V capable of autonomous driving that includes the vehicle control device 40 as in the present exemplary embodiment, this enables the performance of unnecessary image processing during travel or the like to be effectively suppressed, and enables the occurrence of delays in processing such as driving control to be avoided.

Moreover, in the present exemplary embodiment, safety can be ensured by performing travel control and door opening/closing control in accordance with the image processing results.

Moreover, in the present exemplary embodiment, it is estimated that the scene is a door opening/closing scene, in which the door 14 is opened/closed, in a case in which the vehicle V has stopped at a predetermined bus stop. This enables the processing load to be reduced by performing only image processing corresponding to the door opening/closing scene.

Furthermore, in the present exemplary embodiment, it is estimated that the scene is a vehicle departure scene in a case in which a departure time has arrived in a state in which the vehicle V is stationary at a predetermined bus stop. This enables the processing load to be reduced by performing only image processing corresponding to the vehicle departure scene.

While explanation has been given regarding the vehicle image processing device 10 according to an exemplary embodiment, it will be evident that various embodiments may be implemented within a range not departing from the gist of the present disclosure. In the exemplary embodiment described above, the operation scene estimation unit 58 estimates the operation scene of the vehicle V based on at least one of time information, position information, a travel plan, and vehicle information; however, there is no limitation thereto. For example, the operation scene of the vehicle V may be estimated based on at least one of time information, position information, and vehicle information. Namely, the scene may be estimated to be a scene of having stopped at a bus stop from the time information and the position information. Alternatively, the scene may be estimated to be a scene during travel based on only vehicle speed information, which is vehicle information.

Although a configuration has been adopted in the exemplary embodiment described above in which the image processing unit 60, from among the four image processing operations of door opening/closing image recognition processing, wheelchair image recognition processing, departure determination image recognition processing, and critical-state patient image recognition processing, performs image processing corresponding to the operation scene of the vehicle V estimated by the operation scene estimation unit 58; there is no limitation thereto. For example, as another type of image processing, image processing to detect an object forgotten by a passenger may be executed.

Moreover, the relationship between the information used and the image processing illustrated in FIG. 5 is an example, and there is no limitation thereto. Namely, the processing load may be monitored in real time, and in a situation in which the processing load is small, control may be performed so as to execute an increased amount of image processing.

Furthermore, although the vehicle V is an electric vehicle in the exemplary embodiment described above, there is no limitation thereto. For example, the vehicle image processing device 10 may be applied to a hybrid electric vehicle (HEV), a plug-in hybrid electric vehicle (PHEV), or a fuel cell electric vehicle (FCEV).

Further, the processing executed by the CPU 20 reading and executing a program in the exemplary embodiment described above may be executed by various types of processor other than the CPU 20. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The image processing may be executed by any one of these various types of processor, or by a combination of two or more of the same type or different types of processor, and may be executed by plural FPGAs, or by a combination of a CPU and an FPGA, for example. The hardware structure of these various types of processors is, more specifically, an electric circuit combining circuit elements such as semiconductor elements.

Further, although the configuration is such that various data is stored in the storage 26 in the exemplary embodiment described above, there is no limitation thereto. For example, a non-transitory recording medium such as a compact disc (CD), a digital versatile disc (DVD), or universal serial bus (USB) memory may serve as a storage unit. In such a case, various programs, data, and the like are stored in these recording media.

What is claimed is:

1. A vehicle image processing device, comprising:
a processor configured to:
acquire information comprising time information, position information, vehicle information, and a travel plan of a vehicle;
estimate an operation scene of the vehicle from among a plurality of operation scenes based on the acquired information comprising the time information, the position information, the vehicle information, and the travel plan of the vehicle;
perform image processing, in accordance with the estimated operation scene, on image information captured inside a vehicle cabin, or in surroundings, of the vehicle;
determine whether or not the estimated operation scene is during travel or during embarking/disembarking, and execute fall person image recognition processing in response to determining that the estimated operation scene is during travel or during embarking/disembarking;
determine whether or not the estimated operation scene is stationary or during door opening/closing in response to determining that the estimated operation scene is not during travel or during embarking/disembarking, and execute door opening/closing image recognition processing and wheelchair image recognition processing in response determining that the estimated operation scene is stationary or during door opening/closing; and
execute, in response to determining that the estimated operation scene is not stationary or during door opening/closing, departure determination image recognition processing,
wherein the vehicle is an autonomous driving vehicle that is configured to:
travel along a predetermined travel route including the travel plan;
stop at a predetermined embarking/disembarking position established on the predetermined travel route; and
open a door and enable passengers to board and alight from an entrance.

2. The vehicle image processing device recited in claim 1, wherein the processor is configured to estimate that the operation scene is a door opening/closing scene, wherein door opening/closing is performed, in a case in which the vehicle has stopped at the predetermined embarking/disembarking position, based on at least the position information and the vehicle information.

3. The vehicle image processing device recited in claim 2, wherein the processor is configured to perform the image processing on an image captured in a door periphery in a case in which the processor has estimated that the operation scene is the door opening/closing scene.

4. The vehicle image processing device recited in claim 1, wherein, in a case in which a time for vehicle departure has arrived in a state in which the vehicle is stationary at the predetermined embarking/disembarking position, the processor is configured to estimate that the operation scene is a vehicle departure scene, wherein the vehicle departs from the predetermined embarking/disembarking position, based on at least the time information and the vehicle information.

5. The vehicle image processing device recited in claim 4, wherein the processor is configured to perform the image processing configured to detect a standing passenger from the passengers from an image captured inside the vehicle cabin in a case in which the processor has estimated that the operation scene is the vehicle departure scene.

6. A vehicle, comprising:
the vehicle image processing device recited in claim 1; and
a vehicle control device configured to perform travel control and door opening/closing control of the vehicle,
wherein the travel control and the door opening/closing control are performed by the vehicle control device in accordance with results of the image processing.

7. A vehicle image processing method, the method comprising, by a processor:
acquiring information comprising time information, position information, vehicle information, and a travel plan of a vehicle;
estimating an operation scene of the vehicle from among a plurality of operation scenes based on the acquired information comprising the time information, the position information, the vehicle information, and the travel plan of the vehicle;
performing image processing, in accordance with the estimated operation scene, on image information captured inside a vehicle cabin, or in surroundings, of the vehicle;
determining whether or not the estimated operation scene is during travel or during embarking/disembarking, and executing fall person image recognition processing in response to determining that the estimated operation scene is during travel or during embarking/disembarking;
determining whether or not the estimated operation scene is stationary or during door opening/closing in response to determining that the estimated operation scene is not during travel or during embarking/disembarking, and executing door opening/closing image recognition processing and wheelchair image recognition processing in response determining that the estimated operation scene is stationary or during door opening/closing; and executing, in response to determining that the estimated operation scene is not stationary or during door opening/closing, departure determination image recognition processing, wherein the vehicle is an autonomous driving vehicle that is configured to:
- travel along a predetermined travel route including the travel plan;
- stop at a predetermined embarking/disembarking position established on the predetermined travel route; and
- open a door and enable passengers to board and alight from an entrance.

8. A non-transitory storage medium storing a program executable by a computer to perform processing, the processing comprising:

acquiring information comprising time information, position information, vehicle information, and a travel plan of a vehicle;

estimating an operation scene of the vehicle from among a plurality of operation scenes based on the acquired information comprising the time information, the position information, the vehicle information, and the travel plan of the vehicle;

performing image processing, in accordance with the estimated operation scene, on image information captured inside a vehicle cabin, or in surroundings, of the vehicle;

determining whether or not the estimated operation scene is during travel or during embarking/disembarking, and executing fall person image recognition processing in response to determining that the estimated operation scene is during travel or during embarking/disembarking;

determining whether or not the estimated operation scene is stationary or during door opening/closing in response to determining that the estimated operation scene is not during travel or during embarking/disembarking, and executing door opening/closing image recognition processing and wheelchair image recognition processing in response determining that the estimated operation scene is stationary or during door opening/closing; and executing, in response to determining that the estimated operation scene is not stationary or during door opening/closing, departure determination image recognition processing, wherein the vehicle is an autonomous driving vehicle that is configured to:
- travel along a predetermined travel route including the travel plan;
- stop at a predetermined embarking/disembarking position established on the predetermined travel route; and
- open a door and enable passengers to board and alight from an entrance.

* * * * *